(12) United States Patent
Chaudhuri et al.

(10) Patent No.: US 10,497,382 B2
(45) Date of Patent: Dec. 3, 2019

(54) ASSOCIATING FACES WITH VOICES FOR SPEAKER DIARIZATION WITHIN VIDEOS

(71) Applicant: Google LLC, Mountain View, CA (US)

(72) Inventors: Sourish Chaudhuri, San Francisco, CA (US); Kenneth Hoover, Markham (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/497,497

(22) Filed: Apr. 26, 2017

(65) Prior Publication Data

US 2018/0174600 A1   Jun. 21, 2018

Related U.S. Application Data

(60) Provisional application No. 62/435,710, filed on Dec. 16, 2016.

(51) Int. Cl.
| | |
|---|---|
| H04N 5/92 | (2006.01) |
| G10L 25/57 | (2013.01) |
| G06K 9/00 | (2006.01) |
| G06K 9/66 | (2006.01) |
| G10L 15/06 | (2013.01) |
| G10L 15/26 | (2006.01) |
| G10L 17/00 | (2013.01) |
| G10L 25/21 | (2013.01) |
| G10L 25/93 | (2013.01) |
| G11B 27/10 | (2006.01) |

(Continued)

(52) U.S. Cl.
CPC .......... G10L 25/57 (2013.01); G06K 9/00288 (2013.01); G06K 9/00744 (2013.01); G06K 9/66 (2013.01); G10L 15/063 (2013.01); G10L 15/265 (2013.01); G10L 17/005 (2013.01); G10L 25/21 (2013.01); G10L 25/93 (2013.01); G11B 27/10 (2013.01); H04N 21/4884 (2013.01)

(58) Field of Classification Search
USPC .................................................. 386/244, 248
See application file for complete search history.

(56) References Cited

U.S. PATENT DOCUMENTS

| | | | |
|---|---|---|---|
| 6,925,197 B2 | 8/2005 | Dimitrova et al. | |
| 9,852,736 B2 * | 12/2017 | Sharma | ................... G10L 19/02 |

(Continued)

FOREIGN PATENT DOCUMENTS

JP   2009253798   10/2009

OTHER PUBLICATIONS

Abu-El-Haija et al., "Youtube-8M: A Large-Scale Video Classification Benchmark", in Google Research, Sep. 27, 2016, pp. 1-10.

(Continued)

Primary Examiner — Nigar Chowdhury
(74) Attorney, Agent, or Firm — Byrne Poh LLP

(57) ABSTRACT

A computer-implemented method for speech diarization is described. The method comprises determining temporal positions of separate faces in a video using face detection and clustering. Voice features are detected in the speech sections of the video. The method further includes generating a correlation between the determined separate faces and separate voices based at least on the temporal positions of the separate faces and the separate voices in the video. This correlation is stored in a content store with the video.

20 Claims, 9 Drawing Sheets

(51) Int. Cl.
H04N 21/488 (2011.01)
H04N 9/80 (2006.01)

(56) References Cited

U.S. PATENT DOCUMENTS

| | | | | |
|---|---|---|---|---|
| 2003/0154084 | A1* | 8/2003 | Li | G06K 9/00228 704/273 |
| 2006/0210245 | A1* | 9/2006 | McCrossan | G11B 27/105 386/213 |
| 2006/0288291 | A1* | 12/2006 | Lee | G11B 27/28 715/723 |
| 2007/0011012 | A1* | 1/2007 | Yurick | G10L 15/26 704/277 |
| 2008/0306995 | A1* | 12/2008 | Newell | G11B 27/034 |
| 2009/0089056 | A1* | 4/2009 | Fujii | G06F 17/30746 704/246 |
| 2009/0222258 | A1* | 9/2009 | Fukuda | G10L 25/93 704/203 |
| 2010/0074590 | A1* | 3/2010 | Momosaki | G11B 27/034 386/278 |
| 2012/0010884 | A1* | 1/2012 | Kocks | G10L 17/00 704/240 |
| 2013/0080916 | A1* | 3/2013 | Lopez | H04N 5/445 715/753 |
| 2015/0098690 | A1* | 4/2015 | Abbate | G11B 27/031 386/231 |
| 2016/0203818 | A1* | 7/2016 | Cha | G10L 15/26 704/235 |
| 2016/0227282 | A1* | 8/2016 | Chang | H04N 21/4332 |
| 2017/0148444 | A1* | 5/2017 | Bocklet | G10L 17/22 |
| 2017/0150193 | A1* | 5/2017 | Park | H04N 21/23614 |
| 2017/0243582 | A1* | 8/2017 | Menezes | G10L 15/26 |

OTHER PUBLICATIONS

Anguera et al., "Speaker Diarization A Review of Recent Research", in IEEE Transaction on Acoustics, Speech, and Signal Processing, Aug. 2010, pp. 1-16.
Defays, D., "An Efficient Algorith for a Complete Link Method", in The Computer Journal, May 1976, pp. 1-3.
Everingham et al., 'Hello! My name is . . . Buffy'—Automatic Naming of Characters in TV Video, in Proceedings of the 17th British Machine Vision Conference, Edinburgh, UK, Sep. 7, 2006, pp. 1-10.
Fleiss, J., "Measuring Nominal Scale Agreement Among Many Raters", in Psychological Bulletin, vol. 76, Nov. 1971, pp. 378-382.
Gebru et al., "Track the Active Speaker Based on a Joint Audio-Visual Observation Model", in Computer Vision Foundation, Dec. 2015, pp. 1-7.
Hershey et al., "CNN Architectures for Large-Scale Audio Classification", Google Paper, Jan. 10, 2017, pp. 1-5.
Hu et al., "Deep Multimodel Speaker Naming", in Proceedings of the 23rd ACM International Conference on Multimedia, Brisbane AU, Oct. 26-30, 2015, pp. 1-4.
Jegou et al., "Aggregating Local Descriptors Into a Compact Image Representation", in the Proceedings of CVPR, San Francisco, CA, US, Jun. 2010, pp. 1-9.
Lyon, R., "Using a Cascade of Asymmetric Resonators with Fast-Acting Compression as a Cochlear Model for Machine-Hearing Applications", in Autumn Meeting of the Acoustical Society of Japan, 2011, pp. 509-512.
Moattar et al., "A Review on Speaker Diarization and Approaches", in Speech Communication, vol. 54, issue 10, Dec. 2012, pp. 1065-1103.
Monaci, G., "Towards Real-Time Audiovisual Speaker Localization", in the Proceedings of EUSIPCO, Barcelona, ES, Aug. 29-Sep. 2, 2011, pp. 1-5.
Rokach et al., "Clustering Methods", in Data Mining and Knowledge Discovery Handbook, 2005, pp. 321-352.
Sargin et al., "Audiovisual Celebrity Recognition in Unconstrained Web Videos", Google Paper, Apr. 2009, pp. 1-4.
Schroff et al., "FaceNet: A Unified Embedding for Face Recongition and Clustering", in Computer Vision Foundation, Jun. 2015, pp. 815-823.
Shum et al., "Unsupervised Methods for Speaker Diarization: An Integrated and Iterative Approach", in IEEE Transactions on Audio, Speech, and Language Processing, vol. 21, No. 10, Oct. 2013, pp. 2015-2028.
Shum, "Exploiting Intra-Conversation Variability for Speaker Diarization", in the Proceedings of Interspeech, Florence, IT, Aug. 28-31, 2011, pp. 945-948.
Slaney et al., "FaceSync: A Linear Operator for Measuring Synchronization of Video Facial Images and Audio Tracks", in the Proceedings of NIPS, Montreal, CA, Dec. 7-12, 2015, pp. 1-7.
Stevens et al., "A Scale for the Measurement of the Psychological Magnitude Pitch", in Journal of the Acoustic Society of America, vol. 8, Jan. 1937, pp. 185-190.
Tong et al., "E-LAMP: Integration of Innovative Ideas for Multimedia Event Detection", in Machine Vision and Application, vol. 25, pp. 5-15.
Tranter et al., "An Overview of Automatic Speaker Diarization Systems", in IEEE Transactions on Audio, Speech, and Language Processing, vol. 14, No. 5, Sep. 2006, pp. 1557-1565.
Gay et al., "A Conditional Random Field Approach for Audio-Visual People Diarization", in 2014 IEEE International Conference on Acoustic, Speech and Signal Processing (ICASSP), Jul. 14, 2014, pp. 116-120.
International Search Report and Written Opinion dated Dec. 4, 2017 in International Patent Application No. PCT/US2017/053727.
Li, H. et al., "A Convolutional Neural Network Cascade for Face Detection", in 2015 IEEE Conference on Computer Vision and Pattern Recognition (CVPR), Oct. 15, 2015 pp. 5325-5334.
Prahallad, K., "Speech Technology: A Practical Introduction Topic: Spectrogram, Cepstrum and Mel-Frequency Analysis", accessed Oct. 31, 2017, available at: https://web.archive.org/web/20151010225421/tts.speech.cs.cmu.edu/courses/11492/slides/mfcc.pdf.
Woo, D.N. et al., "Unsupervised Speaker Identification for TV News". IEEE Multimedia, vol. 23. No. 4. Feb. 18, 2016. pp. 50-58.

* cited by examiner

ASSOCIATING FACES WITH VOICES FOR SPEAKER DIARIZATION WITHIN VIDEOS

CROSS-REFERENCE TO RELATED APPLICATIONS

This application claims the benefit of U.S. Provisional Application No. 62/435,710, filed Dec. 16, 2016.

TECHNICAL FIELD

The disclosed embodiments relate generally to computer-implemented methods for speaker diarization, and more specifically, to automatic speaker diarization and face identification in videos using video and audio input data.

BACKGROUND

In modern content systems, a very large number (e.g., millions) of videos may be uploaded and distributed by and to users of the content system every day. Many of these videos may be associated with captions, which may be created by the uploading user or other individuals. These captions are used in order to present a video to a user who is unable to hear or play the audio accompanying the video. However, many more videos uploaded to the content system may not be accompanied with captions. For these videos, the content system may attempt to generate captions automatically using various automated captioning systems. However, a video may typically have more than one speaker, with the multiple speakers speaking in different orders and for different durations. This type of scenario may be especially challenging for a traditional captioning system. For example, when two speakers in the video speak in close succession to each other, the captioning system may recognize this duration of speech in the video as a single caption, and combine the recognized speech from both speakers in a single caption, implying a single speaker. Such a caption does not accurately reflect the speech in the video, and thus reduces the accuracy of the captioning system, resulting in a poorer user experience. Hence, a more robust and accurate system is desirable.

SUMMARY

In one embodiment, a computer-implemented method for speech diarization is described. The method comprises determining temporal positions of separate faces in a video using face detection and clustering. Voice features are extracted from the speech sections of the video. The method further includes determining temporal positions of separate voices in the video using clusters of voice features having a threshold similarity. A correlation is generated between the determined separate faces and separate voices based at least on the temporal positions of the separate faces and the separate voices in the video. This correlation is stored in a content store with the video and speaker label data for the video is generated based on the correlation, with the speaker label data indicating a temporal position of unique speakers in the video The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview

The content system described herein provides the advantage of automatically associating the speakers in a video with the speech for each respective speaker. Furthermore, the content system described herein is able to identify the location of speakers in the video, whether the speaker is on-screen or off-screen. The content system detects speech sounds in the audio track of the video, and clusters these speech sounds by individual distinct voice. The content system further identifies faces in the video, and clusters these faces by individual distinct faces. The content system correlates the identified voices and faces to match each voice to each face. By correlating voices with faces, the content system is able to provide captions that accurately represent on-screen and off-screen speakers. For example, if two speakers in a video are having a conversation, the content system is able to identify each speaker's speech and provide separate captions that accurately identify each speaker, rather than having a single caption that combines the speech from both speakers into a single caption. Such a system may also be useful for automated camera selection in a multi camera setup, such as when filming multiple speakers, or in a video conference. The system may also be useful in crowd-sourced captioning/translation of speech in videos, as users who provide captions will not need to manually time the caption start and stop positions, and will not need to indicate which speaker is speaking, as the system will automatically determine these factors. Other applications where such a system may provide an advantage may include, but are not limited to, cinematography, a conversation analyzer (e.g., to determine how natural a conversation is), and so on.

II. System Architecture

Figure 1:
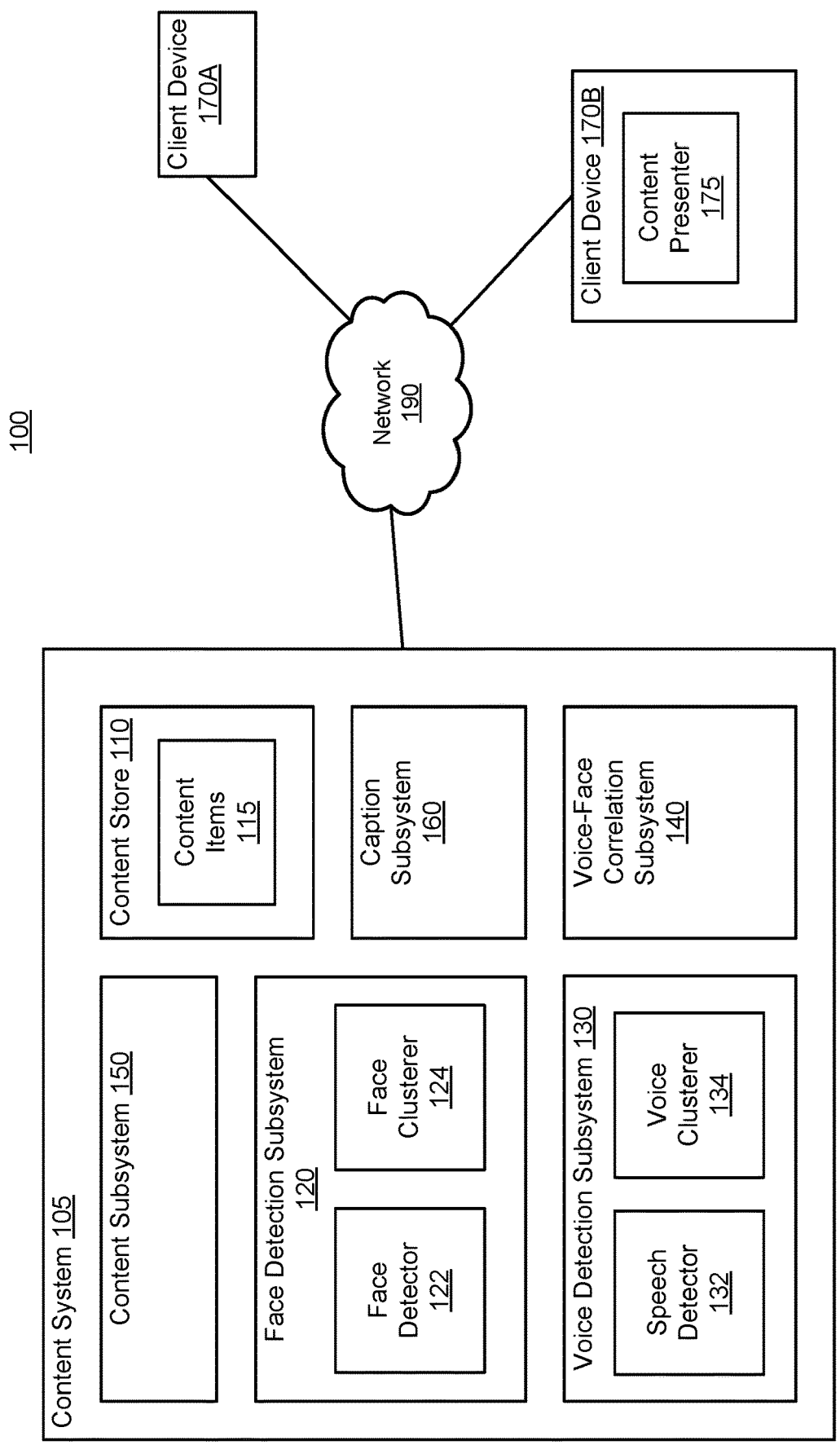
FIG. 1 is a high-level block diagram of an environment for automatic speaker diarization and face identification, according to an embodiment.

FIG. 1 is a high-level block diagram of an environment 100 for automatic speaker diarization and face identification, according to an embodiment. FIG. 1 illustrates a content system 105 with a content store 110, a content subsystem 150, a caption subsystem 160, a face detection subsystem 120, a voice detection subsystem 130, and a voice-face correlation subsystem 140. The content system 105 is connected to a network 190, which is also connected to client devices 170. While certain elements are shown in FIG. 1, in other embodiments the environment may have different elements. Furthermore, the functionalities between elements may be distributed in a different manner in other embodiments, to different or multiple modules.

Client Device and Network

The client device 170 is a computing device that may access content from the content system 105. A user of the client device 170 can access a video from the content system 105 by using the client device 170 to browse a catalog of content, conduct searches using keywords, review play lists from other users or the system administrator (e.g., collections of content forming channels), or view content associated with particular user groups (e.g., communities). Additionally, in some embodiments, the client device 170 may also be used to upload content to the content system 105. The client device 170 may be a desktop, laptop, smart phone, tablet, wearable device, television, set top box, and the like. Although FIG. 1 illustrates only a single client device 170, it should be understood that many client devices 170 (e.g., millions) can communicate with the content system 105 at any time.

In one embodiment, the client device 170 accesses content from the content system 105 and presents the content to the user via a content presenter 175. In one embodiment, the content presenter 175 is accessed through a web browser includes a video player (e.g., an HTML5-compliant player). Furthermore, the content presenter 175 may be able to present to the user the content concurrently with captions received from the content system 105 (e.g., via the content subsystem 160). These captions may be for speech and/or non-speech sounds in the content. The content presenter 175 may be a web browser that allows the user to view web pages and content provided by the content subsystem 150.

In one embodiment, the client device 170 may upload content items to the content system 105 (e.g., via the content presenter 175). Furthermore, a user using the client device 170 may be able to contribute caption data to content items that have already been uploaded to the content system 105. This may be facilitated using a user interface provided by the content presenter 175. For example, the content system 105 may provide timings for captions for a video, and the content presenter 175 presents a user interface with a caption entry field for each timing provided by the content system 105.

Network

The network 190 represents the communication pathways between the client device 170 and the content system 105. In one embodiment, the network 190 is the Internet, but may also be any network, including but not limited to a LAN, a MAN, a WAN, a mobile, wired or wireless network, a cloud computing network, a private network, or a virtual private network, and any combination thereof. In addition, all or some of links of the network 190 can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Content System

The content system 105 provides content items to users of the client devices 170 and also receives content uploaded from the client devices 170. The content system 105 includes a content store 110, a content subsystem 150, a face detection subsystem 120, a voice detection subsystem 130, a voice-face correlation subsystem 140, and a caption subsystem 160. The content system 105 may also include additional elements, subsystems, and servers, such as a load balancing sub-system, a content distribution network, and so on. These and other additional elements are excluded from the illustration in FIG. 1 in order to improve the ease of understanding. In addition, the functionality of each of the illustrated subsystems, and components within each subsystem, may be divided amongst more than one hardware device. For example, the functionality of the content subsystem 150 as described herein may be split across multiple individual servers.

Content Store

The content store 110 of the content system 105 stores content items 115. The content items 115 may include video and/or audio content items of various durations, resolutions, and so on. For example, a content item 115 may include a 4K video file, a 360-degree video file, a saved copy of a live video stream, or a stereoscopic video file. Each content item may include an audio portion. The content store 110 may also store associated metadata for the content items 115, such as speech captions associated with the content items 115. Each content item 115 that is stored in the content store 110 may also be stored with and associated with metadata, such as a title, description, responsive comments, ratings, and so on.

The speech captions include transcribed text of the speech sounds in a number of content items 115 in the content store 110. Speech sounds may include any type of audio that may be intelligible as language. This may include spoken dialogue, rhythmic spoken words, sung words, and so on. The timing window includes a start timestamp and an end timestamp, and the text includes a transcription of the speech sound present in a content item between the start timestamp and end timestamp.

Content Subsystem

The content subsystem 150 provides access to, viewing and listening of, and allows the uploading of the content items 115 (process not shown). The content subsystem 150 allows users to access the content items 115 in the content store 110 via searching and/or browsing interfaces. The content items 115 can be sourced from user uploads of content, from searches or crawls of other websites or databases of content, or the like, or any combination thereof. For example, in one embodiment the content subsystem 150 can be configured to allow for user uploads of content. The content subsystem 150 stores these uploaded content items in the content store 110. As another example, the content subsystem 150 may retrieve content from other content databases over the network 190.

The content subsystem 150 processes search queries received from a user. A search query may include search criteria, such as keywords that may identify videos the user is interested in viewing. The search criteria may also specify various filtering and sorting criteria. The content subsystem 150 may use the search criteria, for example, to query the metadata of and/or entities associated with all the content items 115 stored in the content store 110. The search results from the query are transmitted by the content subsystem 150 to the client device 170.

The content subsystem 150 may receive content from client devices 170 (process not shown). The processing of the received content may include assigning an identification number to the newly received content. Other steps of processing the received content may include formatting (e.g., transcoding), compressing, metadata tagging, content analysis, and/or other data processing methods.

The content subsystem 150 may receive, in addition to the content, accompanying caption data. The caption data may indicate the start and end times of captions corresponding to speech (and non-speech sounds) in the content. The content may also be associated with other information, such as title, description, content type, author, ratings, and so on. The content subsystem 150 stores the content (and any associated metadata) in the content store 110.

The content subsystem 150 may serve content in a similar fashion to YouTube™; other video hosting websites are known as well, and can be adapted to operate according to the teaching disclosed herein.

Face Detection Subsystem

The face detection subsystem 120 detects separate faces in a video and may also indicate the temporal position of these faces in the video. The face detection subsystem 120 may also indicate the location of the faces in the video frame when the face appears in the video frame. The face detection subsystem 120, in one embodiment, includes a face detector 122 and a face clusterer 124. Although particular components are described here, in other embodiments the functionality of the face detection subsystem 120 is distributed among different components. For example, the components described here for the face detection subsystem 120 may be performed in a single module.

The face detector 122 detects faces in the video and indicates the temporal positions of the detected faces. The face detector 122 may use multiple different methods of face detection to detect faces in the video, or may use a single method. If multiple methods are used, the face detector 122 may detect a face in a portion of the video where a threshold number or majority of the methods indicate a detected face. In one embodiment, the face detector 122 uses a method to detected the existence of faces for each video frame of the video. The face detector 122 may initially detect face candidates in the frame, which are potential element in the video that may be a face. The face detector 122 may give each face candidate a fitness score, and those face candidates with a fitness score above a certain threshold may be detected by the face detector 122 to be a face. The face detector 122 may also determine the location of the detected face in the video frame.

The face detector 122 may also perform other operations, such as transforming the video frames with the detected faces in order to align and crop the frames so that the output image with the face is made to look similar to all other outputs (e.g., facial features appear in similar positions in all output images). These outputs may be fed into a face clustering process, such as face clusterer 124, to cluster the detected faces.

The face clusterer 124 performs face clustering, i.e., groups detected faces together that are determined to belong to the same speaker. The face clusterer 124 receives detected faces from the face detector 122, and determines which of these faces belong to the same speaker, i.e., the face clusterer 124 clusters the detected faces.

In general, the face clusterer 124 determines facial features shared by the different detected faces in order to determine whether any of the faces belong to the same speaker. For example, the face clusterer 124 may measure the distance between various facial features, such as the eyes in two transformed images, to determine the similarity of two detected faces. The face clusterer 124 may perform various image transformation techniques, such as edge detection, convolution with a filter, and so on, in order to manipulate the transformed images and compare the values in the results to see if a threshold value or multiple threshold values are met, indicating a that the two detected faces are likely of the same speaker. The face clusterer 124 may also utilize a trained model, such as a convolutional neural network, to determine similarity between detected faces.

After determining which images have faces that are similar, the face clusterer 124 is able to indicate the segments of the video in which similar faces appear. The segments may be indicated by the face clusterer 124 using temporal positions, e.g., start and stop timestamps of the segments. For example, if a face A appears in the first 5 minutes of a video, and later appears again for 3 minutes after a 10 minute gap, then the temporal positions for face A in the video may correspond to 0:00-5:00 and 15:00-18:00.

The face clusterer 124 may store these temporal positions for each separate detected face in a video in the content store 110 and associate this information with the video content item 115 in the content store 110 as metadata for the video.

Additional details regarding the face detection subsystem 120 are described below with reference to FIGS. 2-9.

Voice Detection Subsystem

The voice detection subsystem 130 detects separate voices (i.e., those voices that belong to separate speakers/persons) in a video and indicates the temporal positions of these voices in the video. The voice detection subsystem 130, in one embodiment, includes a speech detector 132 and a voice clusterer 134. Although particular components are described here, in other embodiments the functionality of the voice detection subsystem 130 is distributed among different components. For example, the components described here for the face detection subsystem 130 may be performed in a single module.

The speech detector 132 detects speech in the audio portion of a video. The speech detector 132 generates raw scores indicating a probability that a segment of audio for a video includes a speech sound, i.e., any sound that may resemble human speech. To generate these raw scores, the speech detector 132 splits or divides the audio portion into multiple segments and analyzes each segment using a trained model or classifier to determine the likelihood value indicating whether the segment of the audio exhibits speech sounds. The model may be trained using features extracted from a corpus of data comprised of existing caption labels for speech sounds in audio streams.

The speech detector 132 generates a binary score from the raw scores by smoothing the raw scores. To do this, the speech detector 132 aggregates a series of raw scores over consecutive segments of the audio portion to generate an aggregate value. For example, the score smoother 120 may aggregate the raw scores from segments of the audio totaling 1000 ms of time. The aggregation may be a mathematical or statistical operation such as an average or median. If the aggregate value exceeds a threshold, then the binary score for that series of consecutive segments may be set to 1 (i.e., on or high, indicating the presence of speech). Otherwise the binary score for that series of consecutive segments may be set to 0 (i.e., off or low, indicating the absence of speech).

After determining these binary scores, the speech detector 132 determines timestamps for those segments of the audio that include speech (e.g., a binary score of 1). The speech detector 132 may store these along with the video content item 115 in the content store 110. The speech detector 132 may also transmit the timestamps, along with the features extracted from the audio segments as well using the trained model to the voice clusterer 134.

The voice clusterer 134 performs voice clustering, i.e., groups detected voices together that are determined to belong to the same speaker. Similarly to the face clusterer 124, the voice clusterer 134 determines which segments of speech in the audio for a video belong to the same speaker. The voice clusterer 134 receives the feature vectors for the detected speech segments from the speech detector 132, and iterates through the feature vectors to combine those that are similar beyond a threshold value. At each iteration, the voice clusterer 134 analyzes the similarity of the voice features for the remaining segments of voices, and combines those that are within a threshold level of similarity. After a specified number of iterations, the voice clusterer 134 arrives at a set of candidate voices (i.e., voice clusters) that are most likely to be unique and from separate speakers, although in some cases the voice clusterer may overestimate and determine that there are more candidate voices than actual voices in the video, as described in further detail below.

In one embodiment, the voice clusterer 134 may use VLAD, or Vector of Locally Aggregated Descriptors, to determine the similarity between two voice segments using the features extracted from these segments of audio.

The separate voices determined by the voice clusterer 134 may be stored in the content store 110 for a video content item 115.

Additional details regarding the face detection subsystem 120 are described below with reference to FIGS. 2-9.

Voice-Face Correlation Subsystem

The voice-face correlation subsystem 140 determines a correlation between the separate faces determined by the face detection subsystem 120 and the voices detected by the detection subsystem 130. In other words, the voice-face correlation subsystem 140 determines which voices belong to which faces.

In one embodiment, the voice-face correlation subsystem 140 analyzes for each speech segment in the video, the number of times each separate face (as determined by the face detection subsystem 120) appears during the segment. The voice-face correlation subsystem 140 selects the face that appears most frequently during the speech segment as the face to be associated with the voice in that speech segment (and all other speech segments with that voice). In another embodiment, the voice-face correlation subsystem 140 determines for each separate voice the number of times each separate face appears in the video when the voice is detected. The face that appears most often is determined by the voice-face correlation subsystem 140 to be the face associated with voice.

In some cases, there may be more detected voices than faces. Due to the inaccuracy in the voice detection subsystem 130, the voice detection subsystem 130 may be configured with a threshold that likely identifies a higher number of candidate voices in the video than the number of faces in the video. In such a case, more than one voice may be associated with a single face. As the face detection subsystem 120 may be more accurate, a more accurate result may be achieved by correlating multiple voices with a few number of faces.

The voice-face correlation subsystem 140 may store this association in the content store 110 for each video. Thus, after computing the voice-face correlation for a video, the content store 110 may store the temporal positions of voices, faces, the positions of detected faces, as well as the correlation between faces and voices in the video.

Caption Subsystem

The caption subsystem 150 provides captions to client devices 170 for presentation with associated content items 115, and may also provide an interface for users to provide captions for content items 115 that may not have captions associated with them.

When a client device 170 requests, and is presented with a content item 115, if that client device 170 also requests captions for the content item 115, the caption subsystem 150 may provide the captions for the content item 115 to the client device 170 for presentation alongside the content item 115. The caption subsystem 150 may select the captions associated with the content item 115 and transmit these captions to the client device 170 with instructions to present the captions at certain times during the playback of the content item 115 such that the captions are presented according to timing information. For example, the instructions may cause the client device 170 to present the text for a caption entry during playback between the start timestamp and the end timestamp of the timing window associated with a caption entry. In addition, the instructions may also instruct the client device 170 on how to visually format the text for presentation (e.g., font style, font type, font size, text position on screen, etc.). In one embodiment, in addition to speech captions 140, the caption subsystem 150 also retrieves a set of non-speech captions describing non-speech sounds in the content item (e.g., laughter) and transmits these non-speech captions to the client device 170 along with instructions on how to present them.

The caption subsystem 150 receives user-generated entries for captions from client devices 170 for content items 115 that do not have caption information or have incomplete or inaccurate caption information (e.g., automatic captioning using speech recognition may not produce accurate results). The users of the client devices 170 can transcribe the speech sounds (e.g., spoken dialogue) in the content items 115 into text and submit this transcribed text to the caption subsystem 150, which may store them as part of caption entries.

In one embodiment, the caption subsystem 150 provides captions based upon the speakers identified by the face detection subsystem 120, the voice detection subsystem 130, and the voice-face correlation subsystem 140, as described below. Additional details regarding this process are described below with reference to FIG. 8

III. Voice-Face Correlation Exemplary Process

Figure 2:
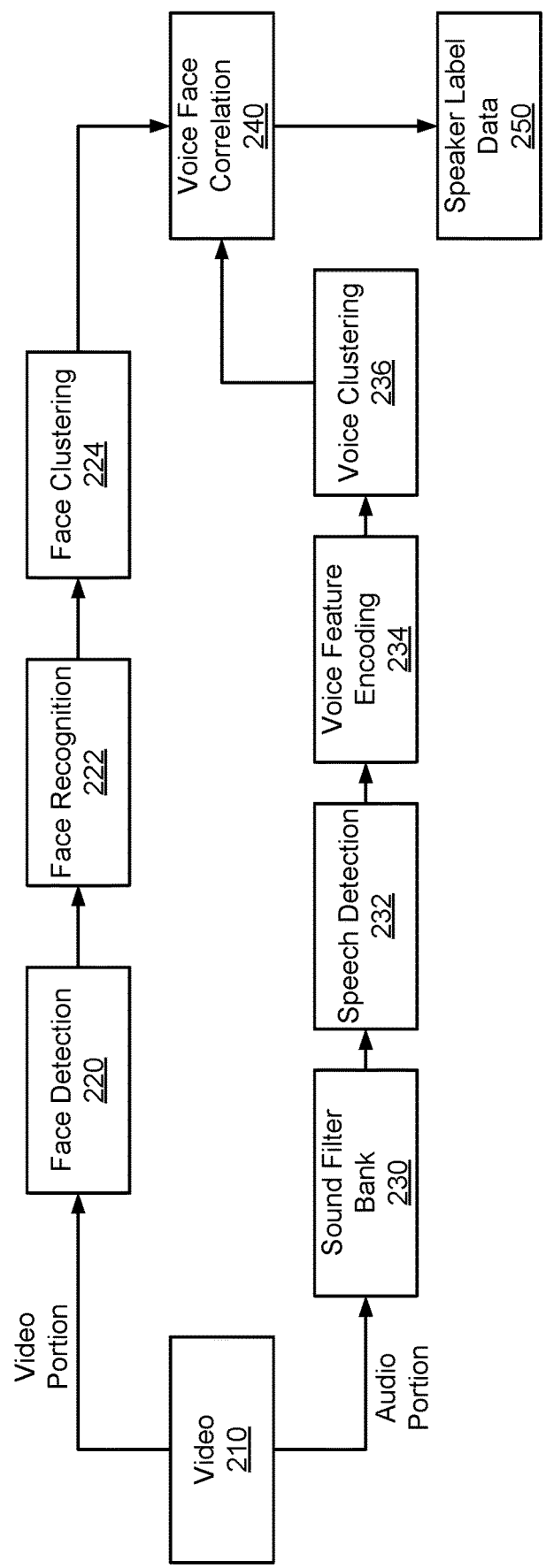
FIG. 2 is a high-level diagram of an exemplary process for voice-face correlation, according to one embodiment.

FIG. 2 is a high-level diagram of an exemplary process for voice-face correlation, according to one embodiment. In one embodiment, the process described here is performed by the content system 105 described above. For example, the processes 220-224 are performed by the face detection subsystem 120, the processes 230-236 are performed by the voice detection subsystem 130, and the process 240 is performed by the voice-face correlation subsystem 140. Although particular components are described here, in other embodiments the functionality of the face detection subsystem 120 is distributed among different components. For example, the components described here for the face detection subsystem 120 may be performed in a single module.

The example process described here begins with a video 210. The video 210 may be stored in the content store 110, may be uploaded by users, and may be associated with various metadata, such as captions. Many videos, such as the video 210, include spoken audio in the audio portion of the video, which may be from multiple speakers. For example, a video may be of an interview between a talk show host and a guest. The video 210 may also be a live stream that is delivered substantially in real time from a host (e.g., a client device 170) to the content system 105 and presented by the content system substantially in real time to different client devices 170. The video 210 may be a combination of multiple live streams, such as in a video conference, where multiple users capture live video which is combined, e.g., by the content system 105, into a single live video that is delivered back to the multiple users and/or to other users.

Face Detection

The face detection subsystem 120 performs the process of face detection 220 on the video. The face detection 220 process detects the existence of any faces in the video. As described above, multiple methods of face detection may be used to determine whether faces exist as well as the temporal positions of these faces in the video. Additionally, the face detection 220 process may also determine the location of faces in the video frame (e.g., via a bounding box around a detected face).

In one embodiment, the face detection 220 process detects a face in a frame of the video using a method that first detects a high contrast or easily detectable portion of a face, e.g., eye regions (where the image may be darker). The method may then determine multiple face candidates based on the features identified in the video frame. These candidate faces may be normalized according to lighting and other factors and compared to a set of standard faces (e.g., "eigen-faces"). This comparison may occur by determining the difference, or distance, in the facial features in the detected face candidates compared to the standard faces.

Another method that may be used in the face detection 220 process is to statistically analyze the pixel values and corresponding pixel locations in the video frame (instead of facial features) and compare these to template values (e.g., from a sample set of data) to determine whether a face exists. Other methods may also be employed, alone or in combination, such as using a hidden Markov model, linear discriminant analysis, bunch graph matching, and so on.

In one embodiment, the face detection 220 process detects faces based on a cascade of regression trees, which works in part by estimating an initial shape of a face in a video frame, and then iteratively updates the initial shape to match the actual face (if any) in the video frame according to the pixel values in the video frame and the learned weights in the regression trees.

The face detection 220 process may utilize the fact that a face is likely to appear over more than a single frame in the video, and that it may move, and that the camera may move. For example, the movement of the camera in relation to a face candidate, along with detected landmarks in the video, may allow the face detection 220 process to generate an approximate 3D reconstruction of the face candidate. In more detail, the face detection 220 process detects camera motion by determining that the camera is moving in relation to detected fixed landmarks in the video frame. This allows the face detection 220 process to determine the approximate position of the camera of the video in relation to the face candidate. By knowing the approximate position of a camera, the face detection 220 process can generate a 3D representation of the face candidate (e.g., using stereophotogrammetry). This may be compared to standardized 3D face templates to determine a score for the face candidate (e.g., by determining how far the face candidate deviates from the template), and if the score exceeds a threshold, the face detection 220 process determines that the face candidate is a face.

After detecting the faces in the video, the face detection 220 process may transform the images of the faces (in the video frame) using various transformation methods, such as affine transformations, based on the detected location of facial features of the detected face, such that the each detected face is presented in a standardized fashion.

The face detection 220 process may transmit to the face recognition 222 process a transformed image for each video frame in which a face was detected or may transmit a sampling of transformed images. The face detection 220 process may perform rudimentary tracking of faces in the video. This allows the face detection 220 process to determine that a detected face has been continuously on screen for a particular duration of time. For example, if the facial features in a frame match within a threshold value in position, orientation, and size with the facial feature in the previous frame, the face detection 220 process may determine that the two faces are the same. For multiple frames where the face detector 122 detects that the same face on-screen, the face detector 122 may only transmit a sample of transformed images for that detected face. The face detector 124 may also transmit any 3D generated facial data to the face recognition 222 process, as well as the facial feature data that it generated for each detected face.

Face Recognition

The face detection subsystem 120 performs the process of face recognition 222 on the video to determine which of the faces in the video belong to the same person/speaker. The face recognition 222 process receives the transformed images of the detected faces from the face detection 220 process. These transformed images may have faces with facial features in similar locations in the image over all the transformed images. For example, the face, eyes, nose, mouth, and other features of the detected faces in the transformed images may all be in similar locations.

The face recognition 222 process may also receive any feature extracted by the face detection 220 process from the detected faces, such as the distance between the facial features of the detected faces to a "standard" face. Alternatively, the face recognition 222 process may generate features from the received transformed images by detecting the location of facial features in the transformed images, similar to the method described above for the face detection 220 process.

Additionally, the face recognition 222 process may also receive 3D data from the face detection 220 process. This information may also be used to determine similarity between detected faces.

To determine whether detected faces are similar, the face recognition 222 process may compare the facial features in the detected faces with a standard face. The difference between a feature in a detected face and the corresponding feature in the standard face may be represented by a distance score. If two detected faces have similar distance scores (within a threshold value), they may be the same face. This distance score is output to the face clustering 224 process.

In one embodiment, the face recognition 222 process uses a VI Viola-Jones object detection framework to recognize faces based on Haar Features.

In one embodiment, the face recognition 222 process learns a mapping from the transformed images of the detected faces to an embedding representation (i.e., a numerical representation of the faces) using triplets of matching and non-matching examples (i.e., two faces in the triplet may be similar, while one is not) where the closeness in Euclidean space represents the similarity between the images. The face recognition 222 process embeds each face in a 128-dimensional space, providing a compact representation whereby two faces can be compared directly using Euclidean distance to determine if they correspond to the same identity or not. The embedding and Euclidian distance computation may be determined by a trained convolutional neural network (CNN).

The CNN may be trained using a large training set of images of faces, such as a set of labeled faces from video frames stored in the content system 105. The training set may be arranged such that inputs into the CNN when performing the training include sets of images. Each set may include two images that identify the same face, but one that does not (i.e., the triplet). In this way, the CNN may be trained to distinguish between those similar and dissimilar faces in images. The CNN may be trained to filter on many different aspects of the images. Once trained, the CNN is capable of receiving two images of faces from the video and indicate a distance score between these two. The distance score indicates the differences between the faces captured in these two images. The face recognition 222 process may compare the faces received from the face detection 220 process to a standard face (e.g., an "eigen-face") that has been generated from an average or combination of a large number of faces. The large number of faces may be extracted from faces in videos stored in the content store 110. Alternatively, one or more faces in the current video may be used as comparison faces for the faces received from the face detection 220 process. In one embodiment, the process described here uses the FaceNet system developed by Google, Inc. Note that the distance score may include multiple components, e.g., a vector of values. Each value may indicate a distance between different features in two faces.

The face recognition 222 process may generate a distance score for all transformed images that it receives, or it may do so only for transformed images that are indicated to be from different portions of the video separated by at least a minimum time period. For example, the face recognition 222 process may not determine the similarity between two transformed images of two adjacent video frames, but may instead compare these to transformed images in video frames that are separated by at least a minimum time period.

Face Clustering

The face detection subsystem 120 performs the process of face clustering 224 on the video to determine the list of separate faces in the video as well as the temporal positions of the separate faces. The face clustering 224 process receives the distance scores from the face recognition 222 process for the transformed images containing detected faces for the video. From these, the face clustering 224 process determines which faces belong to the same speaker or person.

The face clustering 224 process may determine that a set of transformed images are of the same person as the distance scores for these transformed images are similar or within a threshold value. The face clustering 224 process may also perform a statistical analysis on these scores, such as determining the standard deviation of the scores, and determining that the transformed images have faces that are the same person when the statistical analysis results are within a threshold amount.

In one embodiment, the face clustering 224 process uses hierarchical clustering to cluster the distance scores for each detected face together. In particular, the face clustering 224 process uses single-linkage clustering on the distance scores of each face.

After determining which transformed images have detected faces of the same person, the face clustering 224 process determines the temporal position that each separate face of each person appears on-screen in the video. The face clustering 224 process may determine that when a transformed image of the separate face of a particular person first appears in the video, the temporal position of the video frame from which the transformed image was extracted indicates a start timestamp for the separate face, and when the face is no longer detected, the current temporal position is the stop timestamp for that separate face. Such a period of time where a face is detected is one segment for that face. Each separate face of a person in the video may have multiple segments, each with start and stop timestamps, where the separate face appears on-screen in the video. The face clustering 224 process generates this information and may store it (e.g., in the content store 110).

In one embodiment the face clustering 224 process may perform a smoothing process. When face of a person is not detected for a small number of video frames below a maximum, the face clustering 224 process may not consider these frames to be a gap and end the current segment for that face at that point. Instead, the face clustering 224 process includes the gap within the current segment for the face. The segment for the face ends when a larger gap greater than threshold value is encountered, where the face for that person is no longer detected.

Sound Filter Bank

In a process that may run in parallel to the face clustering process, the voice detection subsystem 130 passes the audio portion of the video 210 through a sound filter bank 230. The voice detection subsystem 130 may split the audio portion into multiple segments of particular duration, each segment offset from the previous by an interval. These segments are passed through sound filter bank 230, which extracts features from each segment. The sound filter bank 230 may divide the input sound into multiple frequency channels, and include a cascade of multiple filters to filter out different ranges of frequencies, with the output from these various filters being used as the basis for the features.

In one embodiment, the sound filter bank 230 uses a Cascade of Asymmetric Resonators with Fast-Acting Compression (CARFAC) model to extract the features. The CARFAC model is based on a pole-zero filter cascade (PZFC) model of auditory filtering, in combination with a multi-time-scale coupled automatic-gain-control (AGC) network. This mimics features of auditory physiology. In other embodiments, the features may be extracted using another model, such as a spectrogram modified by a mel filter bank. Other methods of extracting features, such as using the raw spectrograms of the audio segments themselves as features, or mel filters, may also be used.

Speech Detection

The voice detection subsystem 130 uses the features generated by the sound filter bank 230 in a speech detection 232 process to determine whether any of the segments in the audio portion include speech.

The speech detection 232 process may utilize a machine learning model, such as a deep neural network, a Bayesian network, a support vector machine, or other machine learning model, which accepts as input the values of the features for a segment of the audio and generates a raw score for that segment indicating the likelihood that the segment includes a speech sound. This raw score may be scaled from 0 (0% likelihood) to 1 (100% likelihood). For example, the classifier model 225 may indicate for a segment of the audio that the raw score (i.e., likelihood) of a speech sound occurring in the segment is 0.6 (60%).

The machine learning model may be trained using features extracted from a training data set that includes a ground truth of corresponding caption labels indicating where speech occurs in the training data audio. The training data may be sourced from videos in the content store 110 that include caption data.

The speech detection 232 process may further smooth the raw scores over the multiple segments that are generated by the machine learning model. The goal of the smoothing process is to create a set of binary scores ("speech" or "no speech") that do not fluctuate at a high frequency. To generate the binary scores, the speech detection 232 process generates an aggregate value for each of a series of consecutive segments in the audio stream based on the raw scores of the segments in each series. The aggregate value is computed using an aggregation function, which may be any statistical or mathematical operation that generates a single value from multiple values of a similar type, such as an average. The output from this process is a set of binary values indicating the temporal positions in the audio portion of the video where speech occurs, and where speech does not occur. In the output, while small gaps of lower raw scores in the audio may be smoothed away and the binary score for such a gap indicates speech, larger gaps will still indicate segments of no speech.

After smoothing, the speech detection 232 process outputs the various speech segments for which speech was detected (i.e., where the binary score indicates speech) to the voice feature encoding 234 process.

In one embodiment, the speech detection 232 process also includes speaker turn detection. While in many cases each speech segment corresponds to a different speaker, as there is likely to be a gap between different speakers, in some cases two speakers may speak without any noticeable gap, or with a very small gap in-between the two speakers such that the two speakers' speech is placed in a single speech segment by the speech detection 232 process. To avoid this issue, the speech detection 232 process performs speaker turn detection on the speech segments to determine whether any speech segments include more than one speaker.

In one embodiment, the speech detection 232 process performs speaker turn detection by training a machine learning model. The machine learning model receives as input features audio features extracted from sliding windows of data of a specified duration (e.g., one second) over the speech segment that is being analyzed and determines whether a speaker turn has occurred. The output labels for training the machine learning model indicate whether a speaker turn occurred at a particular window or set of windows. In one case, a single window is moved over the speech segment, and the machine learning model is trained to determine whether a speaker turn occurs within the window as it is slid over the speech segment. In another case, two contiguous windows are slid over the speech segment, and the machine learning model is trained to determine if the speaker changes between the two windows (i.e., the left window has one speaker, and the right window has another speaker). The windows may be "slid" over the speech segment in specified intervals, e.g., 0.1 seconds. After determining that a speaker turn has occurred or has likely occurred (e.g., with a determination above a threshold amount), the speech segment may be split at the determination point into separate speech segments. A single speech segment may be split more than one time depending on how many speaker turns are detected.

Voice Feature Encoding

The voice detection subsystem 130 extracts an embedding from the detected speech segments of the audio portion of the video in the voice feature encoding 234 process. The embedding is a numerical representation of the speech segment, and may be a vector of numerical values that is equal in length (dimension) for any speech segment. In one embodiment, the embedding is generated using a Vector of Locally Aggregated Descriptors (VLAD) technique. The VLAD technique here uses a Gaussian Mixture Model (GMM) which clusters groups of speech patterns. A set of clusters for a standard speech pattern is compared with a cluster of speech patterns of a speech segment of the video to determine a distance value between the two, which is then transmitted to the voice clustering 236 process.

The speech patterns comprise repeatable speech sounds in the language under analysis. For example, if the language is English, then the speech patterns may be 44 different phonemes. Each phoneme may be divided into 3 sub-phones, and this may be generalized into a set of 128 features. A set of these features may be extracted from a standard or average set of English speech sounds the standard speech pattern. The features may be extracted in the same fashion as described above for the sound filter bank 230 process, or may be extracted using a different process, such as via a Mel Frequency Cepstral Coefficients technique (which involves converting the sounds into the frequency domain to derive numeric values). The data set from which the features are extracted for the standard speech pattern may include a large corpus of videos from the content store 110. The features are then modeled using a GMM by the voice feature encoding 234 process. In the GMM, the features are clustered, e.g., by using a k-means process, and the GMM may further be trained, e.g., by using expectation-maximization algorithm over multiple iterations (e.g., 30 iterations), to generate the parameters of the GMM.

For each speech segment, the voice feature encoding 234 process extracts the features from the speech segment in a similar fashion as the generation of the features for the standard speech pattern, but with the audio from the speech segment. The voice feature encoding process 234 generates a segment speech pattern for that speech segment. The voice feature encoding 234 process also models the segment speech pattern in the GMM. A new set of clusters is generated by the voice feature encoding 234 process for the segment speech pattern, and this is compared to the clusters for the standard speech segment. The voice feature encoding 234 process determines the difference values (e.g., Euclidian distance) between the clusters of the different speech patterns and these difference values are used as the embedding. For example, the voice feature encoding 234 process may generate a residual vector for each cluster, which is used in the difference computation. Note that the number of clusters in the two patterns is the same and so each segment speech pattern will have an embedding with the same number of values.

In an alternative embodiment, instead of using a GMM, the voice feature encoding 234 process uses an i-vector approach, linear discriminant analysis, support vector machines, or any other process capable of deriving an embedding of fixed dimensions from a speech segment.

Voice Clustering

The voice detection subsystem 130 takes the embedding generated in the voice feature encoding 234 process and uses the voice clustering 236 process to determine which voices belong to the same speaker.

The voice clustering 236 process compares each embedding for each speech segment with the other embeddings for the other speech segments in the video. A clustering of two embeddings means that the voice clustering 236 process has determined that two embeddings are likely from speech segments belonging to the same speaker. The voice clustering 236 process may compare the components in each embedding with the same components in another embedding according to some metric. This metric represents a distance value between the component values of two embeddings, such as an Euclidian distance. For example, with Euclidian distance, the voice clustering 236 process may compute the square root of the sum of the differences for the like components in the two embeddings. The voice clustering 236 process may use other metrics as well, such as Manhattan distance, maximum distance, Mahalanobis distance.

The voice clustering 236 process may cluster the embeddings over multiple iterations in a hierarchical clustering process. The voice clustering 236 process may use complete-linkage clustering over the multiple iterations. In this process, the embeddings are at the beginning treated as a cluster of its own. At each iteration, those clusters with the closest distance are clustered together. In particular, the distance between two clusters is defined by the maximum metric value that can be computed between an embedding in one cluster and an embedding in the other cluster, i.e., the distance between two clusters is the distance between the two most dissimilar embeddings between the two clusters. At subsequent embeddings, the remaining clusters are further clustered to form new clusters.

Instead of comparing based on the most dissimilar embeddings, the voice clustering 236 process may in another embodiment determine a distance between the sums of the same component of each embedding in one cluster with the sum of the same component in another cluster. The voice clustering 236 process may determine the distance between all like components in this way to compute a total distance. In an alternative embodiment, the voice clustering 236 process may compute the average of the embeddings in one cluster, and compare this with the average of the embeddings in another cluster. Other clustering methods, such as single-linkage clustering, mean clustering, centroid linkage clustering, or minimum energy clustering, may be used.

In addition to hierarchical clustering, the voice clustering 236 process may use a different clustering process, such as centroid-based clustering (e.g., k-means), distribution-based clustering (e.g., EM clustering), density-based clustering, graph models, and so on.

The voice clustering 236 process stops the clustering process at a threshold level. This threshold level indicates a minimum similarity value. Thus, when the closest distance between two clusters falls below the minimum similarity value, the voice clustering 236 process does not cluster the two clusters together. Thus, after the clustering process is completed, the voice clustering 236 process is left with a set of clusters that all have distances to each other that are below the minimum similarity value. Typically, the minimum similarity value is set to be relatively high, such that the number of separate clusters that ultimately results from the clustering process exceeds the number of separate faces detected in the face clustering 224 process. If the voice clustering 236 process determines that the number of clusters is fewer than the number of separate faces, the voice clustering 236 process may increase the minimum similarity value until the number of clusters is equal to or greater than the number of separate faces.

The voice clustering 236 process transmits these clusters (or an indication of these clusters) to the voice face correlation 240 process, along with the temporal positions of the speech segments associated with each cluster.

Voice Face Correlation

The voice-face correlation subsystem 140 performs the voice face correlation 240 process on the clustered faces and voices from the face clustering 224 process and the voice clustering 236 process.

The voice face correlation 240 process receives a list of faces and a list of voices, along with the temporal positions of each face and voice. For example, the temporal position of a face indicates the timestamp positions where the face appears on the screen. Using these lists, the voice clustering 236 process correlates, or associates, different faces with different voices.

The voice face correlation 240 process may any one of a variety of methods for correlating voices and faces. In one method, for each speech segment, which is associated with a voice, the voice face correlation 240 process counts the number of times each separate face appears during (i.e., is coincident with) the temporal positions (e.g., between the start and stop timestamps) for that speech segment. The voice face correlation 240 process correlates the face with the most frequent number of appearances with the voice for that speech segment.

In another method, the voice face correlation 240 process, determines, for each voice (not each speech segment), the number of times each separate face appears for the temporal positions for the voice. In other words, the voice face correlation 240 process determines the number of times each separate face has temporal positions coincident with the temporal positions of the separate voice. The voice face correlation 240 process correlates the face with the most frequent number of appearances with the voice. In this alternative method, the voice associated with the most number of speech segments (i.e., having the largest cluster) is processed first, and those with fewer numbers of segments are processed in descending order.

Note that as there may be more voices detected than faces, more than one voice may associate with a single face.

In one embodiment, the voice face correlation 240 process may feed data back to the face clustering 224 and voice clustering 236 processes when for one voice, two different faces have a similar number (within a threshold) or the same number of occurrences during segments where the voice appears. In this case, the voice face correlation 240 process may request additional clustering steps from the voice clustering 236 process, after it performs an initial correlation. The voice face correlation 240 process may request to determine whether the voice is closer in distance to other voices that are now correlated with the one face or with voices correlated with the other face. The voice face correlation 240 process may associate the voice with the face having the voices that are closer in distance to the voice.

Speaker Label Data

The voice face correlation 240 process may generate a speaker label data 250 based on the computed correlation as described above. The speaker label data 250 includes the detected faces and voices along with the temporal positions where each appears at. The speaker label data 250 may also include the locations in the frame where faces appear. The speaker label data 250 may be stored by the voice face correlation 240 process alongside each corresponding video in the content store 110.

Verification Process

In some embodiments, the output from the process described above may be verified using a verification data set with pre-prepared outputs associating voices with faces and temporal locations, or using human verifiers on a set of videos. Based on the results of the verification, the parameters of the system, such as the parameters of the neural networks, GMMs, clustering parameters (e.g., threshold values), and so on, may be modified so that the system produces a more accurate result.

Exemplary Advantages

Using such a method overcomes the shortcomings of traditional systems and allows for the derivation of signals to understand various aspects of human interaction, such as the appearance of new characters and the topical shifts that may result (e.g., for use in topic-based segmentation), or the relative voice/screen times of participants for meeting effectiveness, etc. In particular, in a traditional system using speaker diarization, overlapping sounds may cause failures in speech detection. Furthermore, heuristics processes, which may be inaccurate, may be needed to determine when to stop clustering in traditional systems.

Instead, using the method described here, by utilizing both audio and video data, a much more accurate and complete identification of speakers may be achieved. Additionally, this provides an advantage of being able to identify the locations speakers on-screen (and off-screen), and whether they are off-screen. This is useful during captioning, where a caption can be placed near a speaker, and the caption text can include only the speech made by that speaker and does not include speech from a speaker who speaks before or after. Moreover, the method can generally work for any type of video, and does not need to be customized for a specific type (e.g., speech, interview, etc.)

Additional applications may include using the location of speakers on screen to assist in the placement of content overlays on the screen (e.g., so that the content does not overlay against the current speaker). The process described here may be useful for scene understanding. For example, the process here may be employed in a device that may determine which speaker is speaking and perform some action (e.g., point an additional camera at the speaker) upon this detection.

Additional details regarding the process described here are shown below in FIGS. 3-9.

IV. Exemplary Illustration of Voice Detection and Clustering

Figure 3:
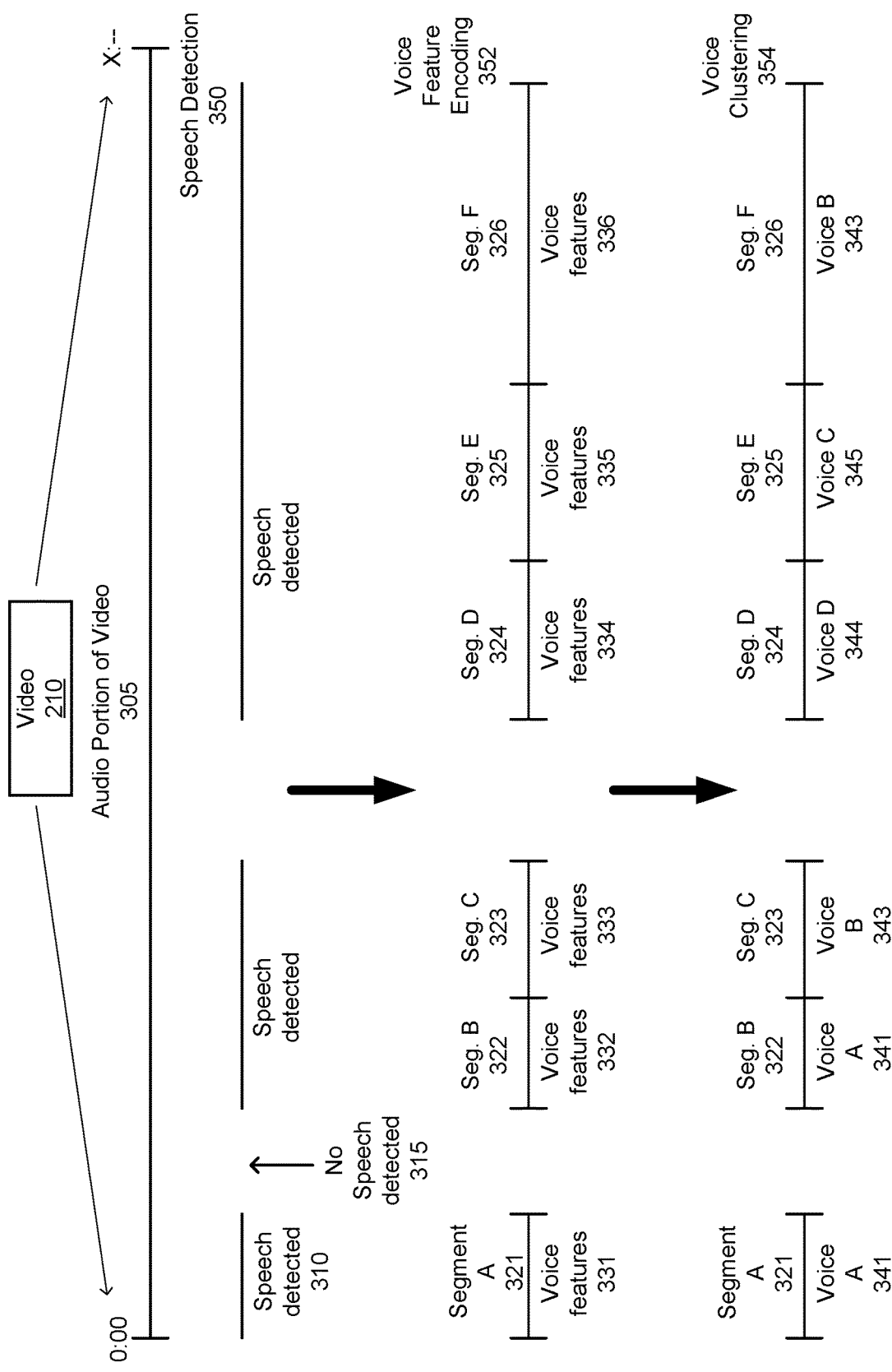
FIG. 3 illustrates an exemplary illustration of voice detection and processing, according to an embodiment.

FIG. 3 illustrates an exemplary illustration of voice detection and processing, according to an embodiment. The process in FIG. 3 may be performed by the voice detection subsystem 130.

The voice detection subsystem 130 extracts the audio portion of the video 305 from the video 210 itself. The first step is a speech detection 350 operation, where speech is detected 310 at different portions of the audio, and no speech is detected 315 at other portions. This operation may be performed by the sound filter bank 230 process and speech detection 232 process as described above.

The voice detection subsystem 130 extracts voice features 331-336 from each of the segments 321-236 for which speech was detected at the voice feature encoding 352 operation. Note that between each segment, there may be a small gap where no speech is detected (although the gap is not shown). This is how the voice detection subsystem 130 may be able to determine the separation between different segments. Note that each segment is assumed to be a different speaker during this phase. The voice features 331-336 (i.e., the embeddings) are extracted from the speech segments in the process described above for the voice feature encoding 234 process.

After the voice features 331-336 are extracted, the voice detection subsystem 130 clusters the voice features to determine the number of voices in the audio portion in the voice clustering 354 operation. Here, four voices 341-346 are determined. Additional details regarding clustering are described below with regards to FIG. 4.

V. Exemplary Illustration of Voice Clustering

Figure 4:
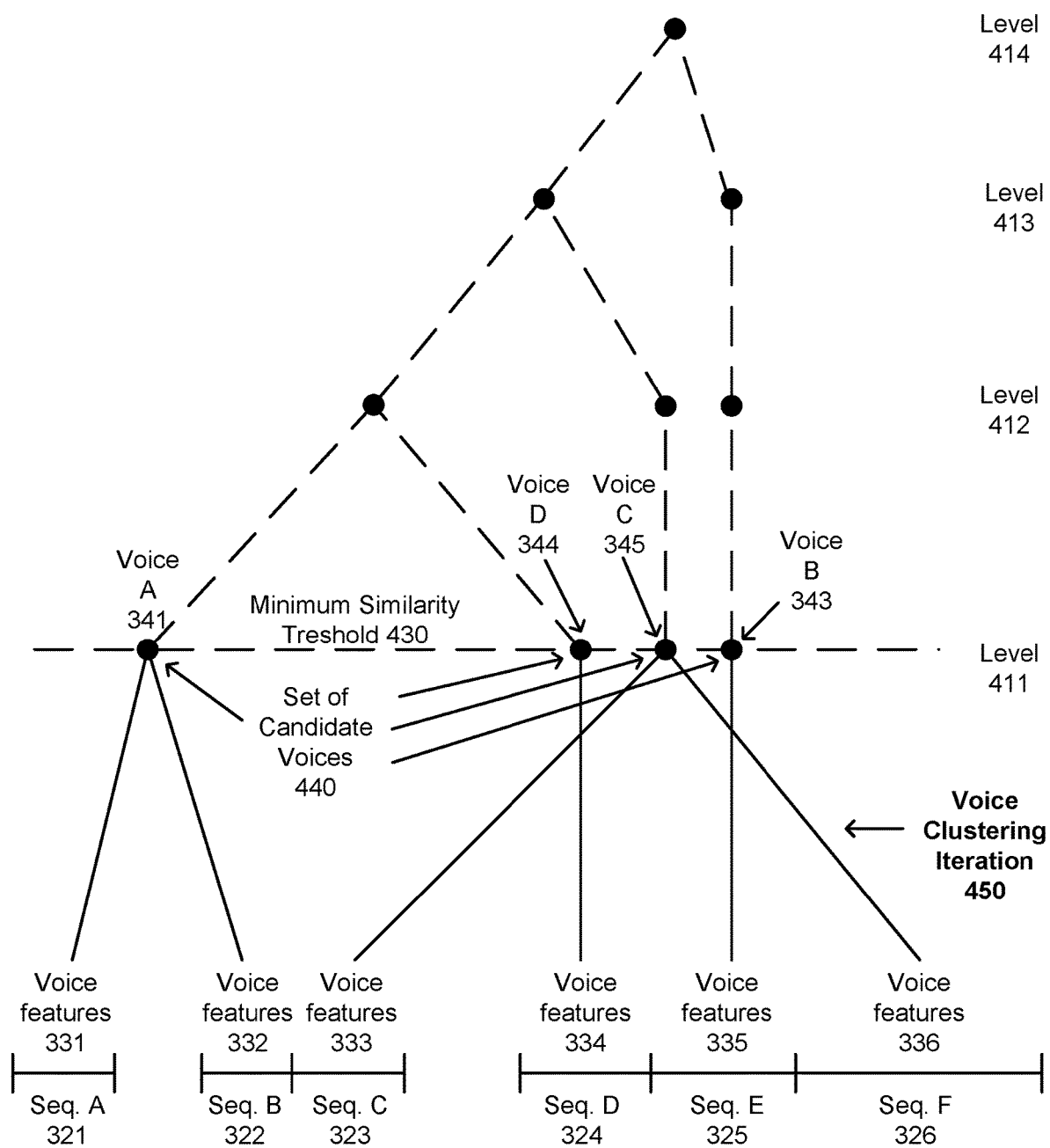
FIG. 4 illustrates an exemplary illustration of voice clustering, according to an embodiment.

FIG. 4 illustrates an exemplary illustration of voice clustering, according to an embodiment. The process in FIG. 4 may be performed by the voice detection subsystem 130.

The voice detection subsystem 130 computes the voice features 331-336 for the segments 321-326 of the audio portion 305. These are passed through a voice clustering process, such as the voice clustering 236 process described above. At each iteration of the process (represented by the levels 411-414), pairs of clusters with the shortest distances are combined. Once the distances between two clusters exceeds the minimum similarity threshold, represented by the dotted line 430, clustering is completed for those clusters. Note that while the minimum similarity threshold 430 is shown as a line in FIG. 3, it may be the case that different clusters exceed the minimum similarity threshold at different levels of the iteration. Thus, some clusters may not be combined at an iteration, while other clusters are still combined at that same iteration.

Here, at the first iteration 450, voice features 331 and 332 are combined, voice features 333 and 336 are combined, and voice features 334 and 335 are not combined as their distance exceeds the minimum similarity threshold. Note that if no threshold existed, these two voice features may have been combined. Furthermore, without the minimum similarity threshold, the clustering process would eventually combine all the voice features into a single cluster at level 414. However, due to the threshold, the voice detection subsystem 130 determines the set 440 of four different voices A, B, C, and D, as shown.

VI. Exemplary Illustration of Face Detection and Clustering

Figure 5:
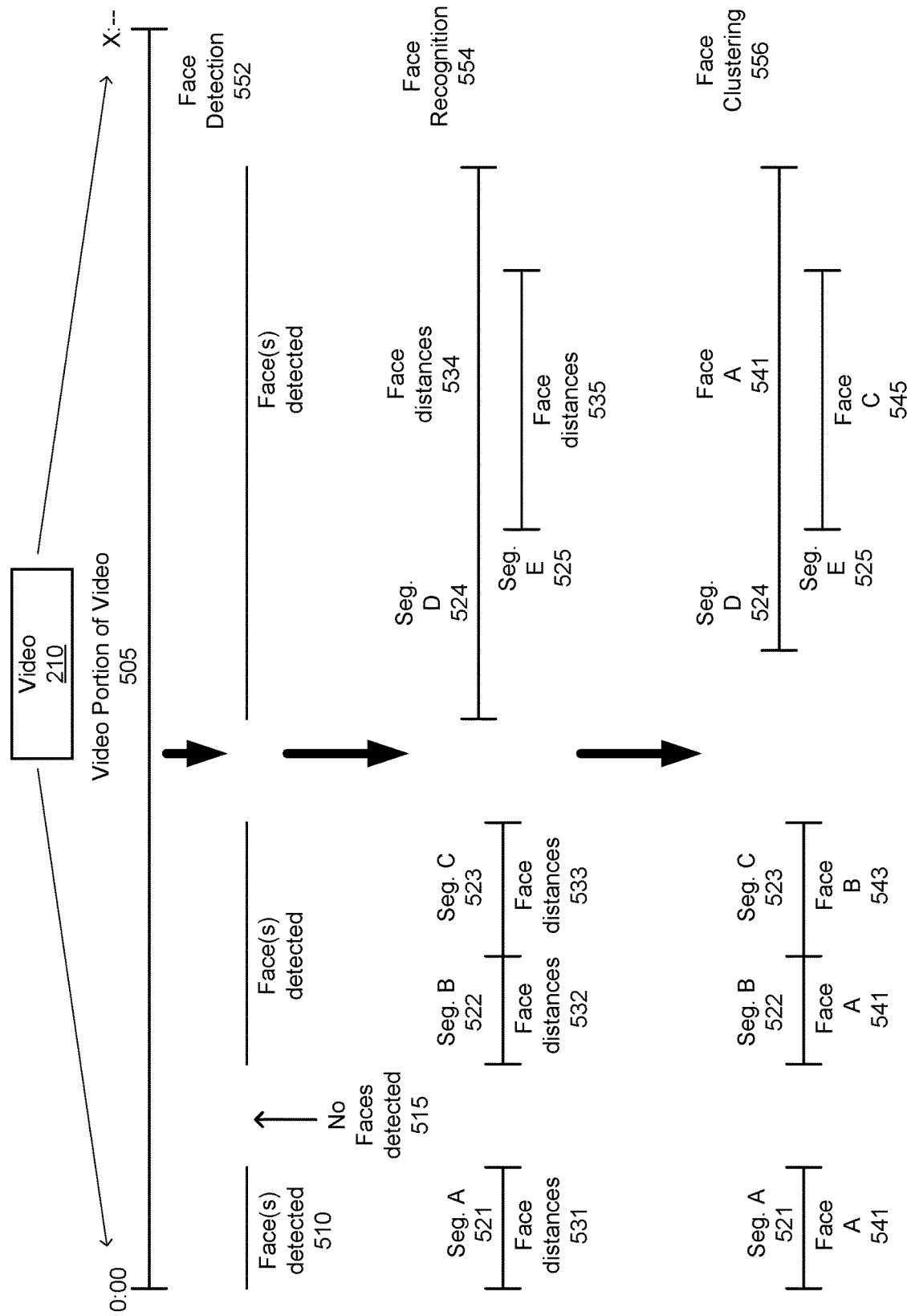
FIG. 5 illustrates an exemplary illustration of face detection and clustering, according to an embodiment.

FIG. 5 illustrates an exemplary illustration of face detection and clustering, according to an embodiment. The process in FIG. 5 may be performed by the face detection subsystem 120.

The face detection subsystem 120 extracts the video portion 505 of the video 210. The face detection subsystem 120 determines if faces exist in various temporal locations of the video portion 505 in the face detection operation 552. Here, faces are detected, for example, at 510 and no faces are detected at 515. The face detection subsystem 120 may perform the face detection operation 552 similarly to the face detection 220 process described above.

The face detection subsystem 120 detects five faces in segments 521-525 in the video portion as illustrated in FIG. 5. Note that these faces may be of the same person. As noted above, the face detection subsystem 120 may perform rudimentary comparison of facial features, or rely on the continuity of a face shown on screen, to determine that within a segment, the displayed face is the same face (and from the same person).

The face detection subsystem 120 generates face distance values 531-535 for the different faces in the face recognition 554 operation. This operation may be performed by the face detection subsystem 120 similarly to the face recognition 222 process. Each set of face distance values 531 for each segment may indicate a distance of that face to a standard face, or to the other detected faces.

The face detection subsystem 120 clusters the faces based on the face distance values, as described above in the face clustering 224 process. Here, the face distance values are compared against each other, and those with short distances are clustered together. In FIG. 5, the face detection subsystem 120 determines three separate faces A-C from the clustering process.

VII. Exemplary Overlay of Detected Faces and Voices

Figure 6:
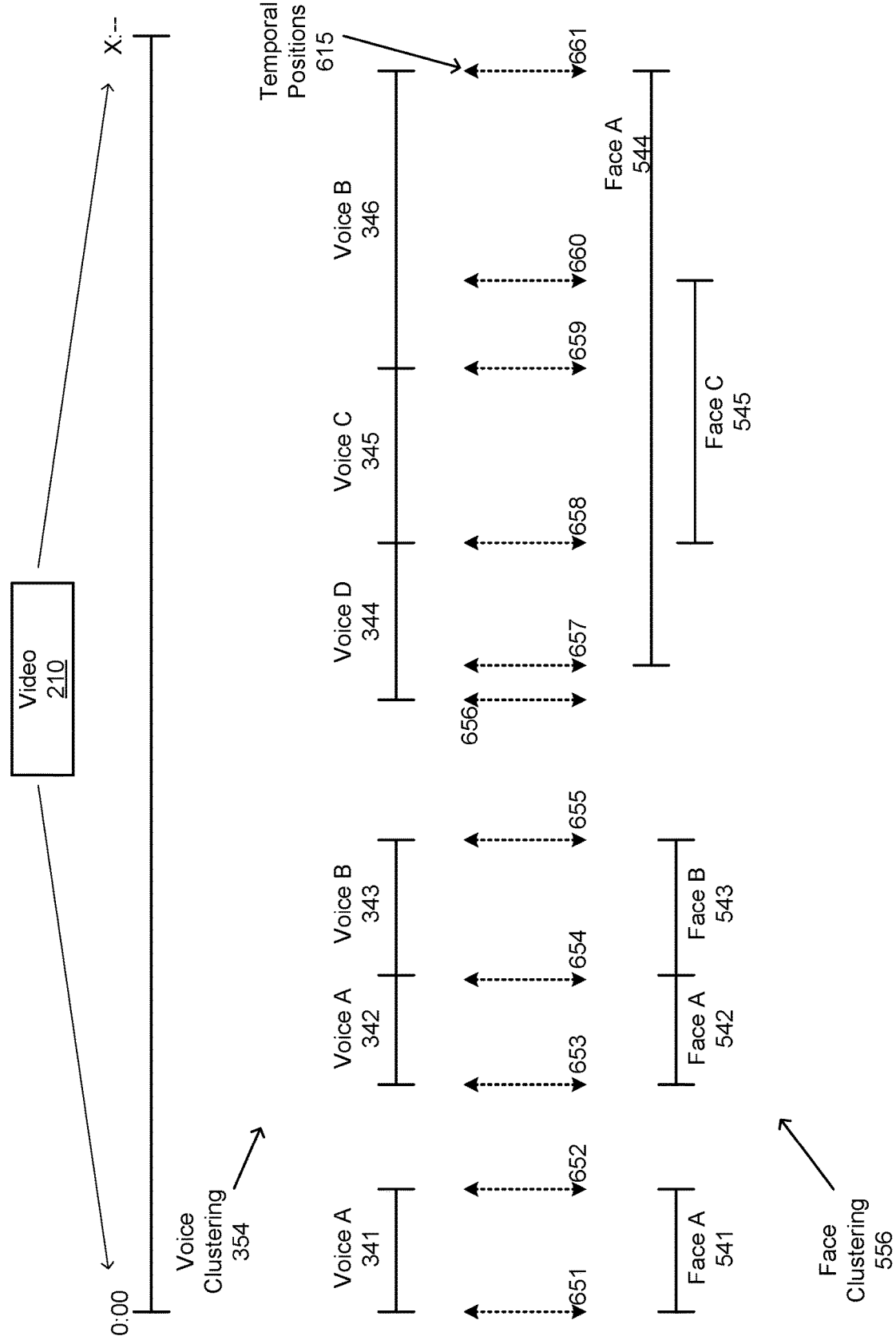
FIG. 6 illustrates an exemplary overlay of the separate voices and faces detected by the voice detection subsystem and the face detection subsystem, according to an embodiment.

FIG. 6 illustrates an exemplary overlay of the separate voices and faces detected by the voice detection subsystem 130 and the face detection subsystem 120, according to an embodiment.

Note that the detected faces do not always correlate with the detected voices in temporal position. For example, while Face A 541 and Voice A 341 correlate in the first segment between temporal positions 651 and 652, the temporal positions 658 and 660 for Face C 545 do not specifically correlate to one detected voice, instead overlapping with Voice C 345 and Voice B 346. This may be due to Face C 545 not speaking during some portion in which Face C 545 appears. In such a case, the content system 105 may identify another speaker, such as Face A 544, as the speaker. Because the content system 105 can detect faces and associate them with voices, the content system 105 can distinguish between persons that are not speaking with persons that are speaking.

In another case, note that Voice D 344 appears at temporal position 656 but no face is detected at that point. Assuming no errors in the face detection process, this may indicate an off-screen speaker, i.e., a person that is speaking but who is not being shown in the video. As described below, in such a situation, the content system 105 may be able to indicate that the speaker is off-screen.

VIII. Exemplary Clustering of Faces and Voices

Figure 7:
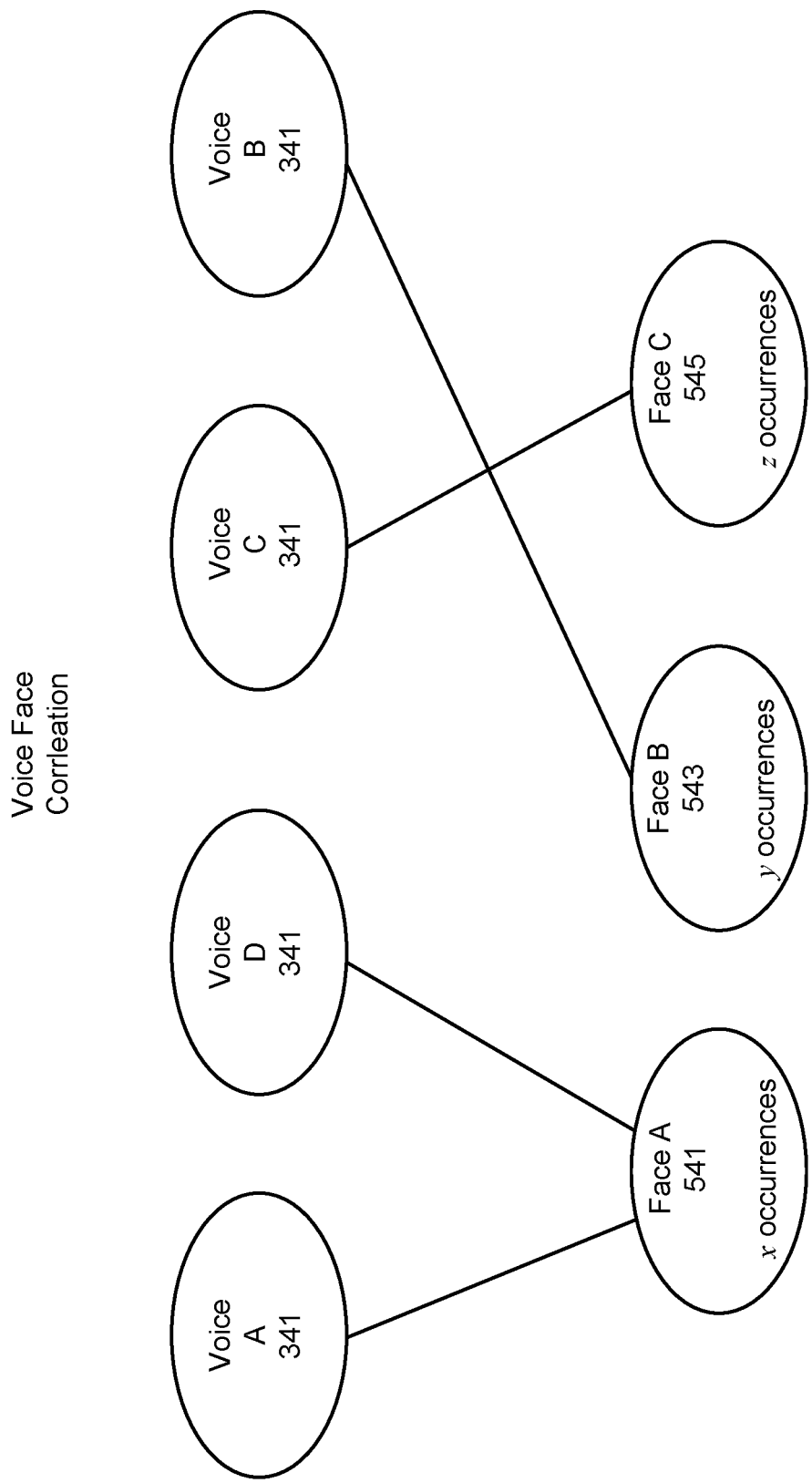
FIG. 7 illustrates an exemplary clustering of voices and faces, according to an embodiment.

FIG. 7 illustrates an exemplary clustering of voices and faces, according to an embodiment. In one embodiment, the clustering process described here is performed by the voice-face correlation subsystem 140 in accordance with the voice face correlation 240 process described above.

Here, the voice-face correlation subsystem 140 determines the voice with the most occurrences in the video. In the illustrated example, this could be Voice A or Voice B. In this case, the voice-face correlation subsystem 140 may randomly select one of the voices or select the one first encountered. In the illustrated example, the voice-face correlation subsystem 140 selects Voice A. For all speech segments where Voice A is detected, the most encountered face is Face A. Thus, the voice-face correlation subsystem 140 correlates Face A with Voice A.

For Voice B, both Face A and Face B are tied for the number of occurrences. In a real-world scenario, this may be unlikely due to the larger number of faces and instances of faces that may be detected, resulting in few ties. However, if a tie were to occur, the voice-face correlation subsystem 140 may select the face that most corresponds in temporal position to the voice. Alternatively, as described above, voice-face correlation subsystem 140 may perform an initial correlation, and adjust the correlation subsequently based on the distances between the voices that have been associated with faces with each other. Here, referring back to FIG. 6, Face B corresponds exactly to Voice B between temporal positions 654 and 655. Thus, the voice-face correlation subsystem 140 may correlate Face B with Voice B. For Voice D, the voice-face correlation subsystem 140 correlates Face A, as Face A appears in the segment for Voice D. Finally, for Voice C, the voice-face correlation subsystem 140 may choose Face C, as the temporal position 658 lines up between the segment for Face C and Voice C. Alternatively, in such a case, the voice-face correlation subsystem 140 does not correlate Voice C with Face A as Face C would not have an associated voice. Thus, between the choice of a face with associated voice(s) and a face without, the voice-face correlation subsystem 140, all other factors being equal, the voice-face correlation subsystem 140 may select the face that has no associated voice.

The final correlation is Voice A and D to Face A, Voice C to Face C, and Voice B to Face B. Note that four voices were detected but only three faces. The voice-face correlation subsystem 140 assumes that the facial detection process is more robust and accurate, and thus there will likely be more voices detected versus faces.

IX. Exemplary Captions Generated Based on Automatic Speaker Detection

Figure 8:
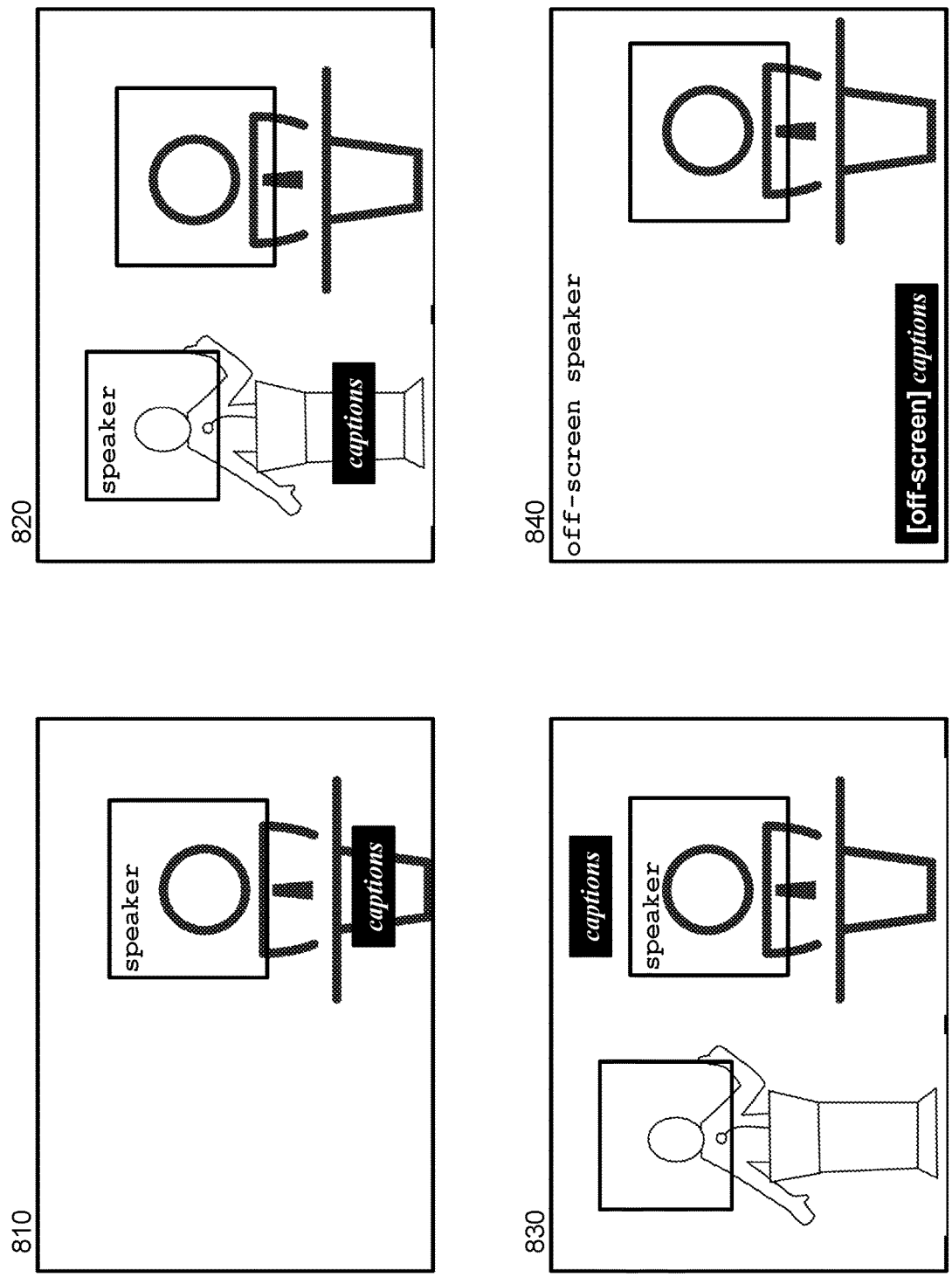
FIG. 8 illustrates an exemplary captioning based on the automatic speaker detection, according to an embodiment.

FIG. 8 illustrates an exemplary captioning based on the automatic speaker detection process described above, according to an embodiment. In one embodiment, the captioning process described here is performed by the caption subsystem 160.

Frame 810 illustrates an example of a single speaker. The caption subsystem 160 may in some cases bound the speaker with a bounding box based on the location of the speaker as generated by the face detection subsystem 120 as described above. Furthermore, the caption subsystem 160 may add the captions for the speaker temporally adjacent to the speaker (e.g., vertically above or below the speaker's detected face). The caption subsystem 160 may also include a "speaker" label or other label in the bounding box to indicate that the person is speaking. Alternatively, or in conjunction, the caption subsystem 160 may also indicate somewhere else in the frame that speech is detected.

Frame 820 illustrates a scenario with two faces, but a single speaker. In this case, the caption subsystem 160 may include bounding boxes around both faces, and indicate in the bounding box having the speaker a label (e.g., "speaker") indicating that the person is speaking. The caption subsystem 160 may also provide the captions for the speaker adjacent to that speaker.

Frame 840 illustrates a change in speaker from the person on the left to the person on the right. In this case, the caption subsystem 160 changes the speaker label to the person on the right, and also move the caption window to be adjacent to the person on the left. When the person on the right begins to speak, as the caption subsystem 160 has received information about the voices and speakers, the caption subsystem 160 creates a new caption box that is discontinuous with the previous caption box for the previous speaker.

Frame 840 illustrates an example of an off-screen speaker. In this case, the caption subsystem 160 shows a bounding box around the face of the person appearing on screen, but since the voice and face clustering information received from the voice-face correlation subsystem 140 indicates that this face is not correlated with the current voice, the caption subsystem 160 instead indicates that the speaker is off screen, possibly with the use of the "off-screen speaker" label, or with the user of "[off-screen]" in the provided caption box.

Note that the caption subsystem 160 may not in all instances indicate a bounding box or "speaker" label for faces. Instead, the caption subsystem 160 may only provide the captions at the appropriate locations in the frame as shown here.

X. Exemplary Flow

Figure 9:
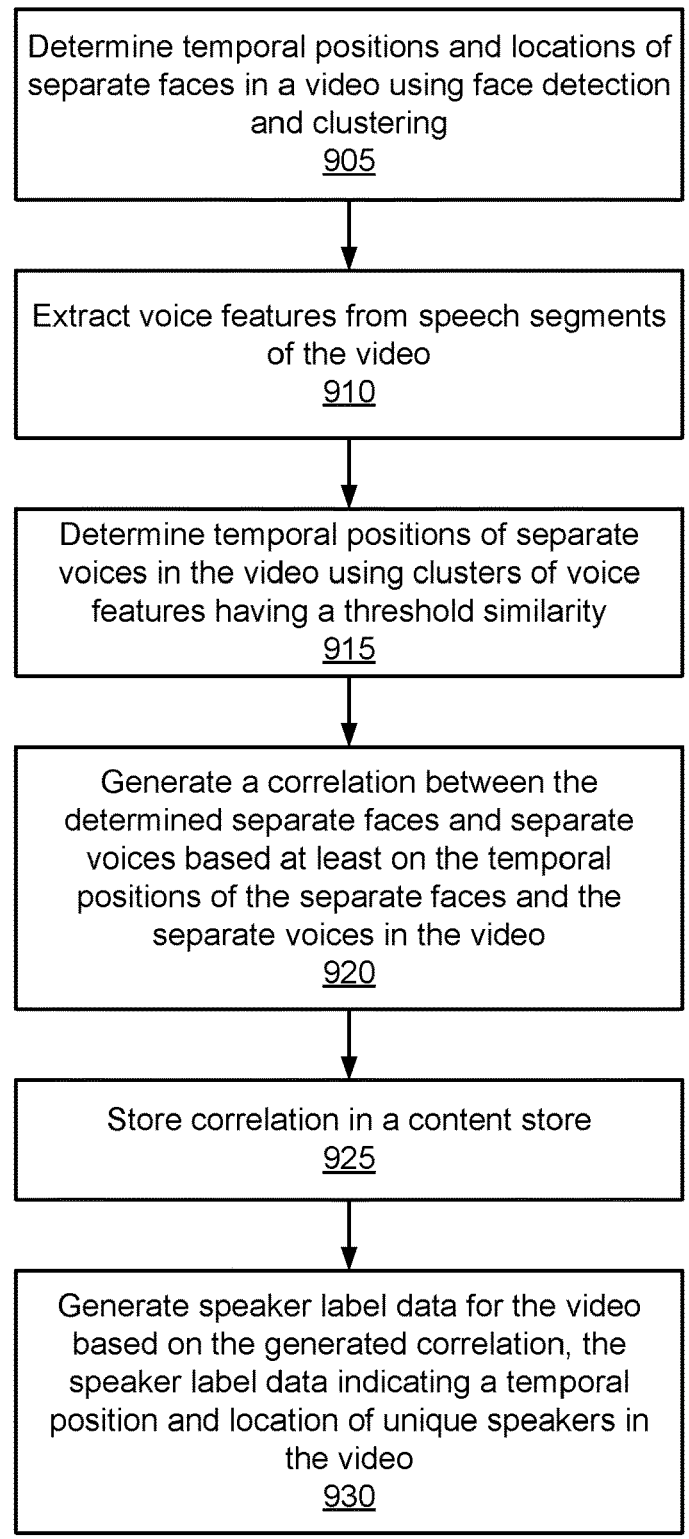
FIG. 9 is a data flow diagram illustrating the actions of the content system 105 for speaker diarization using face and voice data, according to an embodiment.

FIG. 9 is a data flow diagram illustrating the actions of the content system 105 for speaker diarization using face and voice data, according to an embodiment. In one embodiment, the operations in the flow diagram are attributed to the content system 105.

Initially, the content system 105 determines 905 temporal positions and locations of separate faces in a video using face detection and clustering. As described above, this process may be performed by the face detection subsystem 120.

The content system 105 extracts 910 voice features from speech segments of the video. The content system 105 also determines 915 temporal positions of separate voices in the video using clusters of voice features having a threshold similarity. As noted, this may be performed by the voice detection subsystem 130.

The content system 105 generates 920 a correlation between the determined separate faces and separate voices based at least on the temporal positions of the separate faces and the separate voices in the video. This may be performed by the voice-face correlation subsystem.

The content system 105 stores 925 the correlation in the content store for the video. The content system 105 may also generate 930 speaker label data for the video based on the generated correlation, the speaker label data indicating a temporal position and location of unique speakers in the video.

XI. Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which are set forth in the following claims.

What is claimed is:

1. A method comprising:
    determining temporal positions of separate faces in a video using a convolutional neural network that generates distance scores between a detected face in the video and a standard face, the convolution neural network trained using training image data including similar faces and dissimilar faces;
    extracting voice features from speech segments of the video;
    determining temporal positions of separate voices in the video using clusters of voice features having a threshold similarity;
    generating a correlation between the determined separate faces and separate voices based at least on the temporal positions of the separate faces and the separate voices in the video;
    storing the generated correlation in a content store with the video;
    generating speaker label data for the video based on the generated correlation, the speaker label data indicating a temporal position of unique speakers in the video; and
    causing the speaker label data to be presented in connection with presentation of the video.

2. The method of claim 1, further comprising:
    determining video frame locations of separate faces; and
    storing the video frame locations of the separate faces in the speaker label data.

3. The method of claim 1, wherein the threshold similarity is selected conservatively such that the number of number of determined separate voices exceeds the number of determined separate faces.

4. The method of claim 1, wherein the training image data is divided into sets of triples, each triple including two similar faces and one dissimilar face.

5. The method of claim 1, wherein the detected faces are clustered into the separate faces using a single-linkage hierarchical clustering based on the generated distance scores.

6. The method of claim 1, wherein the extracting the voice features is performed by extracting Mel Frequency Cepstral Coefficients from the speech segments.

7. The method of claim 1, wherein the determining temporal positions of separate voices further comprises:
    clustering the extracted voice features of each speech segment using a Gaussian Mixture Model;
    comparing each cluster of extracted voice features with a cluster of a standard voice;
    determining a difference values between each cluster of extracted voice features and the cluster of the standard voice to generate an embedding for each cluster of extracted voice features; and
    identifying separate voices in the video based on distance scores between the generated embeddings, the distance scores between embeddings of each identified separate voice within the threshold similarity.

8. The method of claim 7, wherein identifying separate voices in the video based on distance scores between the generated embeddings further comprises:
    iteratively clustering the embeddings based on distance scores between pairs of embeddings until a distance score between a pair of embeddings falls below the threshold similarity; and
    identifying speech segments associated each set of clustered embeddings as separate voices.

9. The method of claim 1, wherein the generating a correlation between the determined separate faces and separate voices further comprises:
for each determined separate voice:
determining the number of times each determined separate face has a temporal position that is coincident with the temporal positions of the separate voice; and
correlating the determined separate face with the highest number of times of coincidence with the determined separate voice.

10. The method of claim 1, wherein the generating a correlation between the determined separate faces and separate voices further comprises:
for each separate speech segment:
determining the number of times each determined separate face has a temporal position that is coincident with the temporal positions of the speech segment; and
correlating the determined separate face with the highest number of times of coincidence with the determined separate voice having temporal positions coincident with the temporal positions of the speech segment.

11. A non-transitory computer readable storage medium having instructions encoded thereon that, when executed by a processor, cause the processor to:
determine temporal positions of separate faces in a video using a convolutional neural network that generates distance scores between a detected face in the video and a standard face, the convolution neural network trained using training image data including similar faces and dissimilar faces;
extract voice features from speech segments of the video;
determine temporal positions of separate voices in the video using clusters of voice features having a threshold similarity;
generate a correlation between the determined separate faces and separate voices based at least on the temporal positions of the separate faces and the separate voices in the video;
store the generated correlation in a content store with the video;
generate speaker label data for the video based on the generated correlation, the speaker label data indicating a temporal position of unique speakers in the video; and
cause the speaker label data to be presented in connection with presentation of the video.

12. The non-transitory computer readable storage medium of claim 11 having further instructions encoded thereon that, when executed by a processor, cause the processor to:
determine video frame locations of separate faces; and
store the video frame locations of the separate faces in the speaker label data.

13. The non-transitory computer readable storage medium of claim 11, wherein the threshold similarity is selected conservatively such that the number of number of determined separate voices exceeds the number of determined separate faces.

14. The non-transitory computer readable storage medium of claim 11, wherein the training image data is divided into sets of triples, each triple including two similar faces and one dissimilar face.

15. The non-transitory computer readable storage medium of claim 11, wherein the detected faces are clustered into the separate faces using a single-linkage hierarchical clustering based on the generated distance scores.

16. The non-transitory computer readable storage medium of claim 11, wherein the extracting the voice features is performed by extracting Mel Frequency Cepstral Coefficients from the speech segments.

17. The non-transitory computer readable storage medium of claim 11 having further instructions for the determination of temporal positions of separate voices encoded thereon that, when executed by a processor, cause the processor to:
clustering the extracted voice features of each speech segment using a Gaussian Mixture Model;
comparing each cluster of extracted voice features with a cluster of a standard voice;
determining a difference values between each cluster of extracted voice features and the cluster of the standard voice to generate an embedding for each cluster of extracted voice features; and
identifying separate voices in the video based on distance scores between the generated embeddings, the distance scores between embeddings of each identified separate voice within the threshold similarity.

18. The non-transitory computer readable storage medium of claim 17, wherein identifying separate voices in the video based on distance scores between the generated embeddings further comprises:
iteratively clustering the embeddings based on distance scores between pairs of embeddings until a distance score between a pair of embeddings falls below the threshold similarity; and
identifying speech segments associated each set of clustered embeddings as separate voices.

19. The non-transitory computer readable storage medium of claim 11 having further instructions for the generation of a correlation between the determined separate faces and separate voices encoded thereon that, when executed by a processor, cause the processor to:
for each determined separate voice:
determine a number of times each determined separate face has a temporal position that is coincident with the temporal positions of the separate voice; and
correlate the determined separate face with the highest number of times of coincidence with the determined separate voice.

20. The non-transitory computer readable storage medium of claim 11 having further instructions for the generation of a correlation between the determined separate faces and separate voices encoded thereon that, when executed by a processor, cause the processor to:
for each separate speech segment:
determine the number of times each determined separate face has a temporal position that is coincident with the temporal positions of the speech segment; and
correlate the determined separate face with the highest number of times of coincidence with the determined separate voice having temporal positions coincident with the temporal positions of the speech segment.

* * * * *